United States Patent [19]

Krude et al.

[11] 4,317,340
[45] Mar. 2, 1982

[54] LUBRICATING SEAL FOR UNIVERSAL JOINT

[75] Inventors: Werner Krude, Neunkirchen; Karl-Heinz Müller, Wissen, both of Fed. Rep. of Germany

[73] Assignee: Uni-Cardan Aktiengesellschaft, Siegburg, Fed. Rep. of Germany

[21] Appl. No.: 86,249

[22] Filed: Oct. 18, 1979

[30] Foreign Application Priority Data

Nov. 10, 1978 [DE] Fed. Rep. of Germany ....... 2848814

[51] Int. Cl.$^3$ .............................................. F16D 3/30
[52] U.S. Cl. .............................. 64/17 A; 277/212 FB; 308/187.2
[58] Field of Search ............... 64/17 R, 17 A; 277/92, 277/212 FB, 71, 79, 207 R; 308/187.1, 187.2; 74/18.1, 18.2

[56] References Cited

U.S. PATENT DOCUMENTS

| | | | |
|---|---|---|---|
| 3,091,948 | 6/1963 | Zeller | 64/17 A |
| 3,377,820 | 4/1968 | Smith, Jr. | 64/17 A |
| 3,528,301 | 9/1970 | Wasmer | 74/18.2 |
| 4,021,085 | 5/1977 | Willyard | 64/17 R |
| 4,116,019 | 9/1978 | Welschof | 64/17 A |
| 4,138,863 | 2/1979 | Olson, Sr. | 64/17 R |
| 4,147,041 | 4/1979 | Girguis et al. | 64/17 A |
| 4,154,490 | 5/1979 | Kohler et al. | 64/17 A |

FOREIGN PATENT DOCUMENTS

| | | | |
|---|---|---|---|
| 2708137 | 6/1978 | Fed. Rep. of Germany | 64/17 A |
| 739656 | 11/1955 | United Kingdom | 64/17 A |

*Primary Examiner*—Ira S. Lazarus
*Assistant Examiner*—Magdalen Moy
*Attorney, Agent, or Firm*—Toren, McGeady & Stanger

[57] ABSTRACT

A universal joint assembly having a pair of yokes with yoke arms interconnected by a trunnion cross includes a seal member extending between the trunnion cross and a bushing of the assembly, with the seal including a resilient portion defining a lubricant reservoir from which lubricant may be provided for roller bodies of the assembly in order to insure adequate lubrication and long life. The seal is further provided with ribs which define between the seal and the trunnion cross ducts for lubricant flow from the reservoir to portions of the joint assembly including the roller bodies.

2 Claims, 4 Drawing Figures

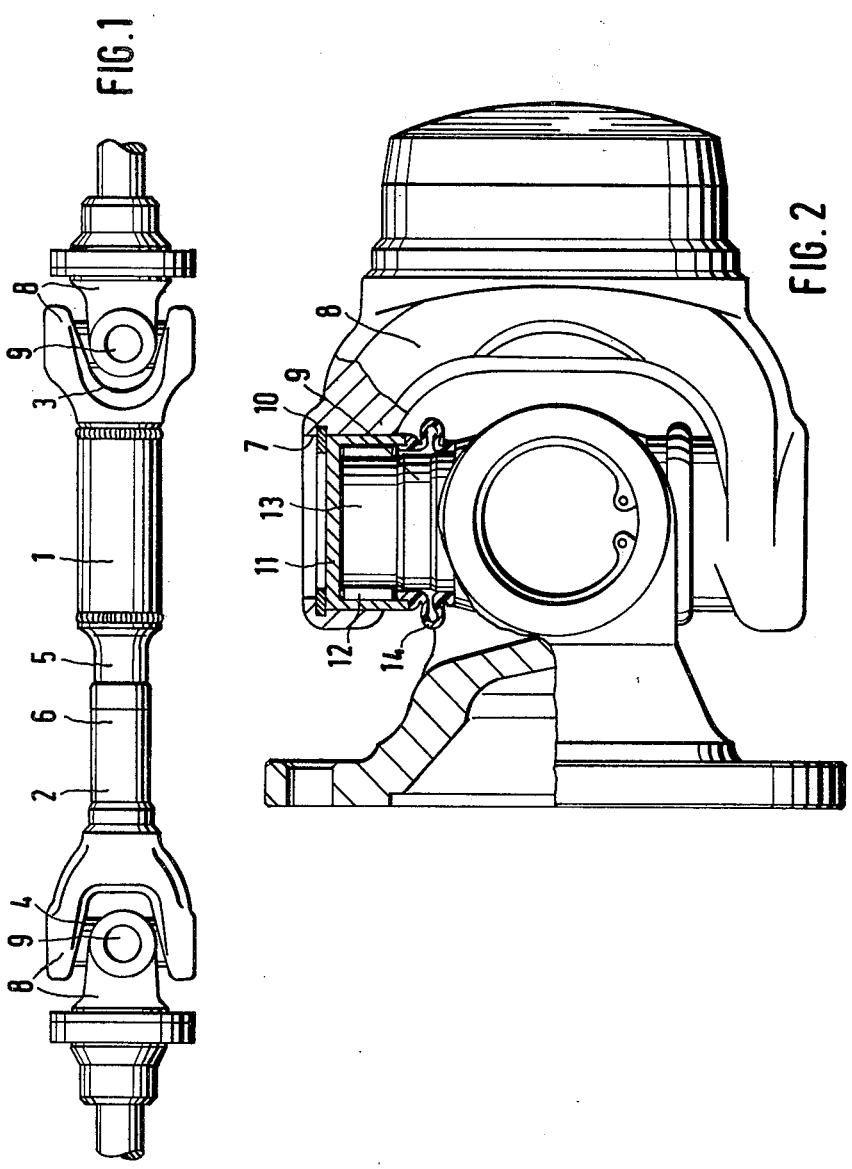

LUBRICATING SEAL FOR UNIVERSAL JOINT

BACKGROUND OF THE INVENTION

The present invention relates generally to a universal joint and, more particularly, to an assembly wherein a trunnion cross interconnects the yoke arms of two yokes of the assembly. More specifically, the invention relates to an assembly wherein upon the trunnion of the cross there are arranged hollow cylindrical bearings or bushings which may contain roller bodies, with the bushings being received in bores of the yoke arms and being axially fixed. The invention is particularly directed to the configuration of seal means interposed between the bushings and the trunnion cross.

Universal joints are known in the prior art, for example, from German Pat. No. 2,618,536, wherein for insuring maintenance-free lubrication during the service life of the assembly, there is provided a supply of lubricant between a continuous elastic seal which covers the body of the trunnion cross. However, such a construction is no longer used in larger trunnion crosses since it is uneconomical to manufacture. In trunnion crosses which are used, for example, in the construction of rolling mills, the cost for providing a coating of, for example, plastic material is so high due to the large diameters involved that they are no longer acceptable from a practical, economical viewpoint.

In view of the foregoing, the present invention is directed to the further development of a trunnion cross having a large diameter which nevertheless provides economical and inexpensive utilization of material, and which permits maintenance-free lubrication of the joint during its service life by insuring a supply of lubricant.

SUMMARY OF THE INVENTION

Briefly, the present invention may be described as a universal joint assembly having a pair of yokes with yoke arms interconnected by a trunnion cross and with bushing means and bearing means interposed between bores in the yoke arms and the trunnion cross. The invention is particularly directed to the configuration of seal means interposed between the bushing means and the trunnion cross which operate to insure an adequate lubricant supply.

More specifically, the seal means is formed with a resilient portion extending between a pair of seal ends which operates to insure lubricant supply from a reservoir formed by the resilient portion.

It is advantageous in this embodiment to provide a seal which is variable since, on the one hand, there is provided the facility for sealing the bushing means relative to the trunnion and, on the other hand, a lubricant reservoir is simultaneously formed, so that maintenance-free operation is ensured during the entire service life of the joint.

During assembly, one end of the seal is initially mounted on the trunnion cross and, subsequently, a grease-filled bushing is arranged on the seal which is in the stretched position, so that, when the bushing means is pushed onto the trunnion of the trunnion cross, excess lubricant is moved into the middle portion of the actual seal whereby an excess pressure is generated by the assembly force of the bushing and the lubricant, which excess pressure, together with a centrifugal force, subsequently allows an appropriate amount of lubricant to continuously flow in the direction of the roller bodies during operation.

To assure permanent flow passage means in the direction of the actual bearing, in accordance with another essential feature of the invention, there is provided between the trunnion and that end of the seal means fastened to the bushing means at least one passage duct which communicates with the reservoir.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a diagram showing a universal joint shaft having universal joints at its ends;

FIG. 2 is a partially sectional view of a universal joint with a trunnion cross and with a respective elastic seal;

DETAILED DESCRIPTION OF THE PREFERRED EMBODIMENT

Figure 3:
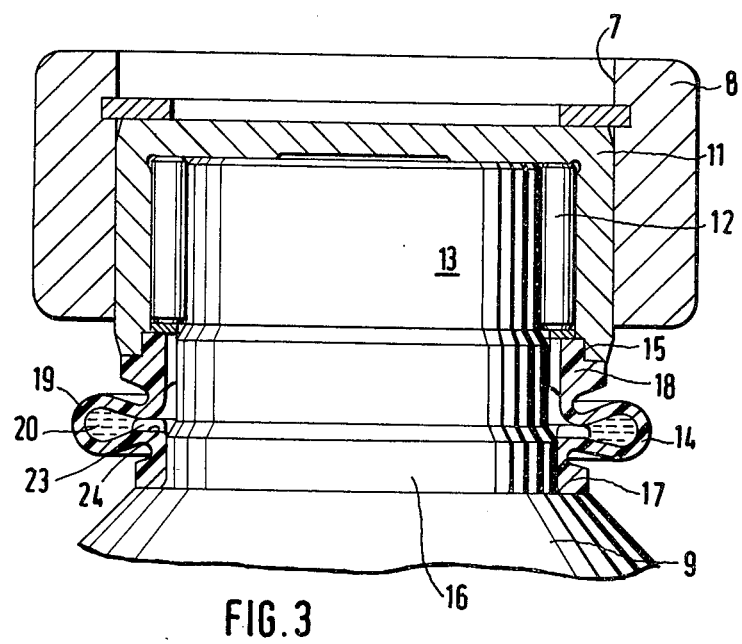
FIG. 3 is a sectional view showing on an enlarged scale a detail from FIG. 2.

A universal joint shaft wherein the present invention may be utilized is illustrated in FIG. 1 and comprises two coaxial universal joint portions 1 and 2 which at their outer ends carry universal joints 3 and 4 whose yoke arms 8 are connected through a trunnion cross 9. The universal joint shaft portion 1 is constructed as a solid shaft 5 at its inner end and the universal joint shaft portion 2 is constructed as hollow shaft 6. Solid shaft 5 and hollow shaft 6 are connected to each other by matching splines so that they are rotatably fixed but axially slidable relative to each other.

The representation shown in FIG. 2 refers essentially to a trunnion cross 9 which is received in bores 7 of the respective yoke arms 8 and is fixed against radial movement by means of a locking ring 10. This fixing is effected by means of a bearing bushing 11 and roller bodies 12 which roll off the trunnion 13 of the trunnion cross 9 and do not permit radial movement of the trunnion cross 9. A seal 14 is provided for sealing the bearing bushing 11 relative to the body of the trunnion cross 9.

Figure 4:
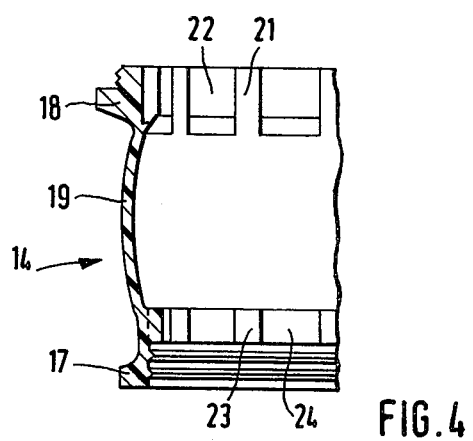
FIG. 4 is a detailed sectional view showing an elastic seal in accordance with the invention.

FIG. 3 shows a detail from FIG. 2 on a larger scale. This detail essentially illustrates the trunnion 13 which is received in the bore 7 of the yoke arm 8 through the roller bodies 12 and the bearing bushing 11. The seal 14 serves as the seal between the bearing bushing 11 and the body of the trunnion cross 9. This seal is received in a step 15 of the bearing bushing 11, on the one hand, and is fixed on a shoulder 16 of the trunnion cross 9, on the other hand. An elastic or resilient middle portion 19 is provided between these fastening points 17 and 18 of the seal 14. FIG. 4 shows this middle portion 19 in the non-assembled state as constructed essentially approximately cylindrically and, during assembly, it is pushed together, as can be seen from FIG. 3 where it is shown in the assembled state. A resulting annular reservoir 20 which is formed by the resilient portion 19 serves for providing a supply of lubricant and, in the assembled state, a pressure acts on this reservoir as a result of the fact that the bearing bushing is pressed together during assembly so that, as a result of this pressure, lubricant flows in the direction of the roller bodies 12.

FIG. 4 essentially shows the seal 14 as an individual part wherein the elastic middle portion is arranged between the fastening points 17 and 18. On its inner side, the fastening point 18 has ribs 21 which are distributed over the circumference and bear against the trunnion 13 of the trunnion cross 9 in the assembled state thereby forming the passage ducts 22. These passage ducts 22 serve to provide a continuous supply of lubricant from the reservoir 20 toward the roller bearing 12 through these ducts 22. On the side of the fastening end 17, there are also provided ribs 23 on the inner side so that between each two of these ribs 23, there is always formed a passage duct 24. As FIG. 3 shows, these ribs 23 have the effect that the elastic middle portion 19 of the seal 14 cannot make contact with the shoulder of the fastening end 17 and thus block the discharge of lubricant. Also at this location, passage ducts 24 remain so that the continuous supply of lubricant to the roller bearing is ensured during operation. Moreover, centrifugal force during rotation of the joint has an additional positive effect.

While the embodiment of the present invention has been described in detail, it will be evident to those skilled in the art, that there are many modifications and changes which can be made herein without departing from the spirit and scope of the invention.

What is claimed is:

1. A universal joint assembly having a pair of yokes with yoke arms interconnected by a trunnion cross comprising: bores in said yoke arms for receiving said trunnion cross therein; bushing means received within said bores and interposed between said yoke arms and said trunnion cross; bearing means interposed between said bushing means and said trunnion cross; seal means having a generally annular configuration extending between said trunnion cross and said bushing means, said seal means having a first annular end fixedly connected to said bushing means and a second annular end fixedly connected to said trunnion cross; an annular resilient seal portion of said seal means extending between said first end and said second end thereof and shaped to define a generally annular lubricant reservoir having a supply of lubricant therein provided between said seal means and said trunnion cross at said resilient portion, said lubricant reservoir operating to provide a sealed supply of lubricant for said bearing means during operation of said universal joint assembly; duct means defined between the inner periphery of said first annular end and said trunnion cross maintaining a continuous lubricant flow path between said lubricant reservoir and said bearing means; and rib means formed on the inner side of said resilient seal portion adjacent said second end of said seal means, said rib means being adapted to be abutted by the inner side of said resilient seal portion adjacent said first end of said seal means in order to maintain a continuously open flow path between said lubricant reservoir and said duct means to said bearing means when said resilient seal portion is bent upon itself.

2. An assembly according to claim 7 wherein said duct means are defined by ribs provided on said inner periphery of said first end of said seal means and extending into engagement with said trunnion cross.

* * * * *